(12) United States Patent
Andrews et al.

(10) Patent No.: US 7,750,895 B2
(45) Date of Patent: Jul. 6, 2010

(54) NAVIGATING LISTS USING INPUT MOTIONS

(75) Inventors: Anton Oguzhan Alford Andrews, Seattle, WA (US); Morgan Venable, San Francisco, CA (US); Craig Lichtenstein, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 546 days.

(21) Appl. No.: 11/771,646

(22) Filed: Jun. 29, 2007

(65) Prior Publication Data
US 2009/0002396 A1    Jan. 1, 2009

(51) Int. Cl.
G06F 3/033    (2006.01)
(52) U.S. Cl. ........................ 345/179; 345/173
(58) Field of Classification Search ......... 345/173–175, 345/179; 178/18.01–18.07, 19.01–19.05
See application file for complete search history.

(56) References Cited

U.S. PATENT DOCUMENTS

| 5,612,719 | A | 3/1997 | Beernink et al. |
| 5,889,236 | A | 3/1999 | Gillespie et al. |
| 6,686,909 | B1 | 2/2004 | Endo |
| 7,061,474 | B2 | 6/2006 | Hinckley et al. |
| 7,184,064 | B2 | 2/2007 | Zimmerman et al. |
| 7,202,857 | B2 | 4/2007 | Hinckley et al. |
| 2004/0196267 | A1 | 10/2004 | Kawai et al. |
| 2004/0259591 | A1 | 12/2004 | Grams et al. |
| 2005/0057524 | A1 | 3/2005 | Hill et al. |
| 2005/0104867 | A1* | 5/2005 | Westerman et al. ......... 345/173 |
| 2006/0026521 | A1 | 2/2006 | Hotelling et al. |
| 2006/0031786 | A1 | 2/2006 | Hillis et al. |
| 2006/0033724 | A1 | 2/2006 | Chaudhri et al. |
| 2007/0080936 | A1 | 4/2007 | Tsuk et al. |
| 2007/0097114 | A1 | 5/2007 | Kim et al. |
| 2009/0251435 | A1* | 10/2009 | Westerman et al. ......... 345/173 |
| 2009/0267921 | A1* | 10/2009 | Pryor .......................... 345/177 |
| 2009/0273575 | A1* | 11/2009 | Pryor .......................... 345/173 |

OTHER PUBLICATIONS

Smith. G.M., "The Radial Scroll Tool: Scrolling Support for Stylus- or Touch-Based Document Navigation," UIST '04, http://eprints.ecs.soton.ac.uk/9247/03/smith_scrhraefelUIST04radialScroll.pdf.
MacKay et al., "Walk 'n Scroll: A Comparison of Software-based Navigation Techniques for Different Levels of Mobility," MobileHCI'05, http://www.edgelab.ca/publications/mackay_mobileHCI.
Kaaresoja et al., "Snap-Crackle-Pop: Tactile Feedback for Mobile Touch Screens," http://research.microsoft.com/~lornab/publications/kaaresoja_EH06.pdf.
Written Opinion for PCT/US2008/067253 mailed Feb. 11, 2009.
International Search Report for PCT/US2008/067253 mailed Feb. 11, 2009.

* cited by examiner

*Primary Examiner*—Ricardo L Osorio
(74) *Attorney, Agent, or Firm*—Marshall Gerstein & Borun LLP

(57) ABSTRACT

A method of navigating items on a display on a computing device with a touch sensitive input device is disclosed. Similar to a bike wheel, the list of items will rotate in relation to the velocity of the input applied including speed up, slow down, stop and change directions.

18 Claims, 6 Drawing Sheets

__NAVIGATING LISTS USING INPUT MOTIONS__

BACKGROUND

As data compression grows, users are able to carry more and more data in portable devices. In addition, the data can be in a variety of forms. However, portable devices are small, including having small input devices. Trying to maneuver through long lists of data becomes increasing difficult and frustrating to users.

SUMMARY

A method of navigating items on a display on a computing device with a touch sensitive input device is disclosed. An input may be accepted at a first location on the input device and a deadzone may be created around the first location. If the input moves outside of the deadzone, a location at which the input leaves the deadzone may be stored. An input direction may be determined by using a direction from a first location to a current location. If the input moves a number of tick distances wherein the number of tick distances is greater than 0, the display of items may be rotated by a factor of the number of tick distances in the input direction. If the input is removed from the device and the velocity of the input movement is above a threshold, the items on the display may be displayed in a manner in which the items rotate past on the display in the input direction at an initial velocity that decreases and in which the initial velocity is in relation to the velocity of the input movement. Similar to a bike wheel, the list of items will rotate in relation to the velocity of the input applied including speed up, slow down, stop and change directions.

DESCRIPTION

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
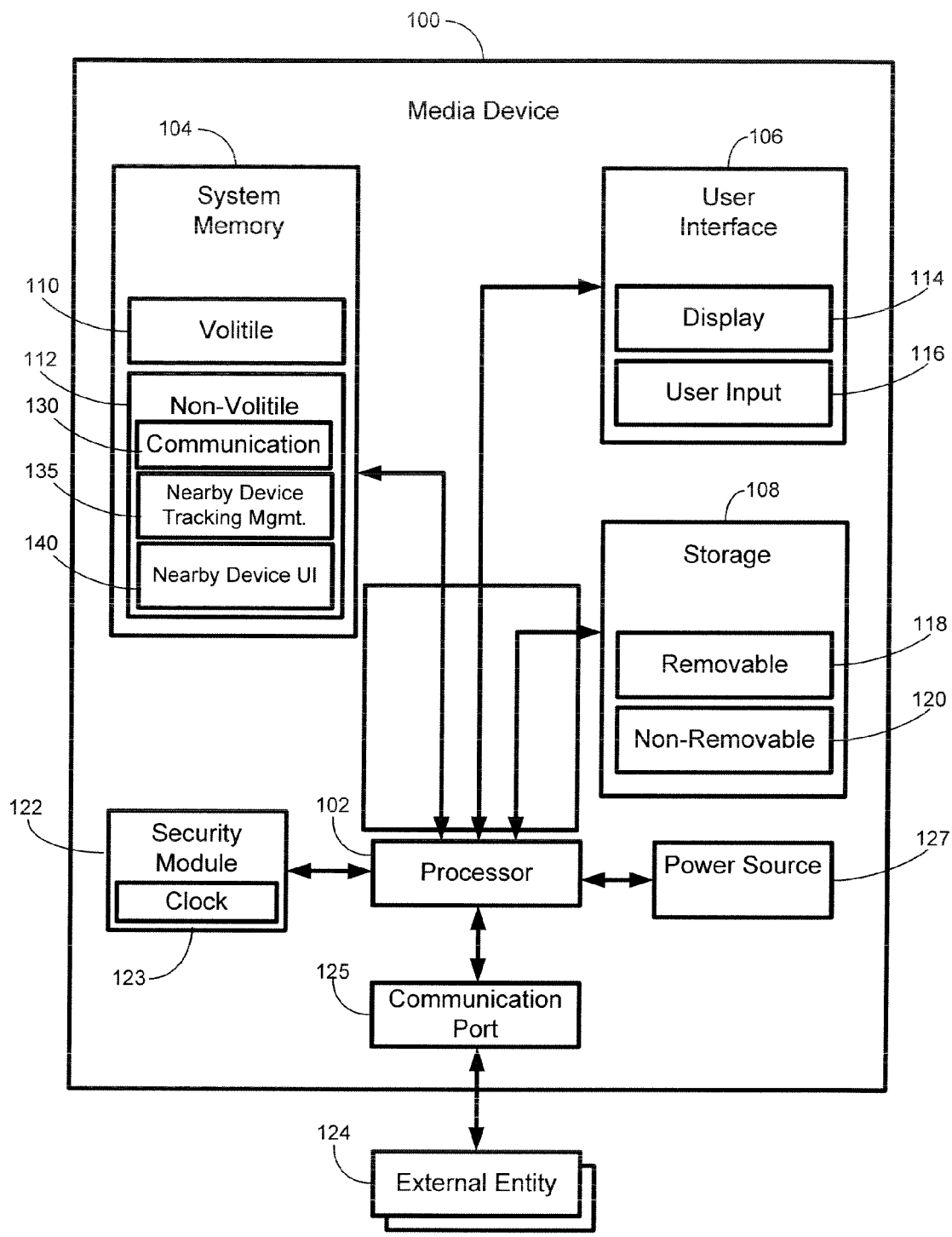
FIG. 1 is an illustration of the architecture a portable media device.

FIG. 1 is an illustration of exemplary hardware that may be used for a media device 100. The media device 100 may have a processing unit 102, a memory 104, a user interface 106, a storage device 108 and a power source 127. The memory 104 may include volatile memory 110 (such as RAM), non-volatile memory 112 (such as ROM, flash memory, etc.) or some combination of the two or any other form of storage device. Applications may be stored as part of the non-volatile memory, including communication applications 130, nearby device tracking management applications 135 and nearby device user interface applications 140.

The media device 100 may also include additional storage 108 (removable and/or non-removable) including, but not limited to, magnetic or optical disks or tape or any other memory. Such additional storage is illustrated in FIG. 1 by removable storage 118 and non-removable storage 120. Computer storage media includes volatile and nonvolatile, removable and non-removable media implemented in any method or technology for storage of information such as computer readable instructions, data structures, program modules, digital media, or other data.

The processing unit 102 may be any processing unit 102 capable of executing computer code to decode media data from a compressed format into a useable form fast enough such that music and video may be played continuously without skips or jumps. When in a portable media device, it may also be useful if the processor 102 is efficient in using power to increase the life of the power source. The processing unit 102 may also be used to execute code to support a user interface and external communications.

The user interface 106 may include one or more displays 114 for both displaying control information and displaying viewable media. The display 114 may be a color LCD screen that fits inside the device 100. The display 114 may display items 115 (FIGS. 2a, 2b and 2c) where the items 115 may be songs, videos, menu options, games, telephone numbers, contacts, etc. User input(s) 116 may include manual buttons, soft buttons, or a combination of both. In addition, the user input may be gesture driven which may use no buttons or may be voice activated. Soft buttons may be used when the display 114 includes a touch screen capability. Manual buttons may include re-definable keys with programmable legends.

The media device 100 may also contain communications connection(s) 125 that allow the device 100 to communicate with external entities 124, such as network endpoints or a computer used for synchronization. The processor 102 also may be in communication with a security module 122. As part of the security module 122 may be a clock 123. The security module 122 assists in ensuring that communication occur only with approved external entities 124.

Communications connection(s) 122 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The power source 127 may be a battery that may be rechargeable. The power source 127 may also be a standard battery or an input from a power converter or any other source of power.

Figure 2:
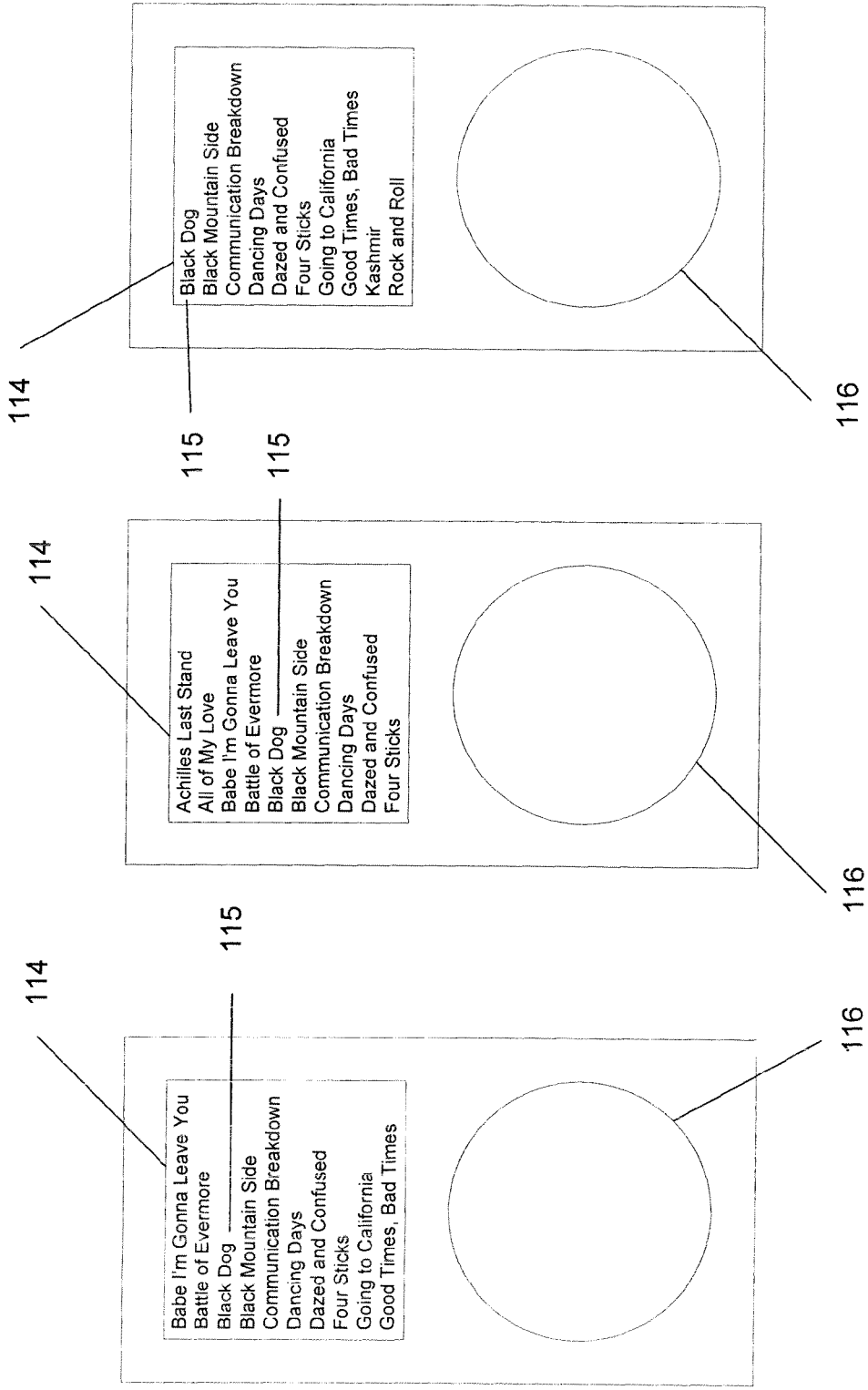
FIGS. 2a, 2b and 2c are illustrations of a portable computing device displaying items where the items move in response to user inputs.
Figure 3:
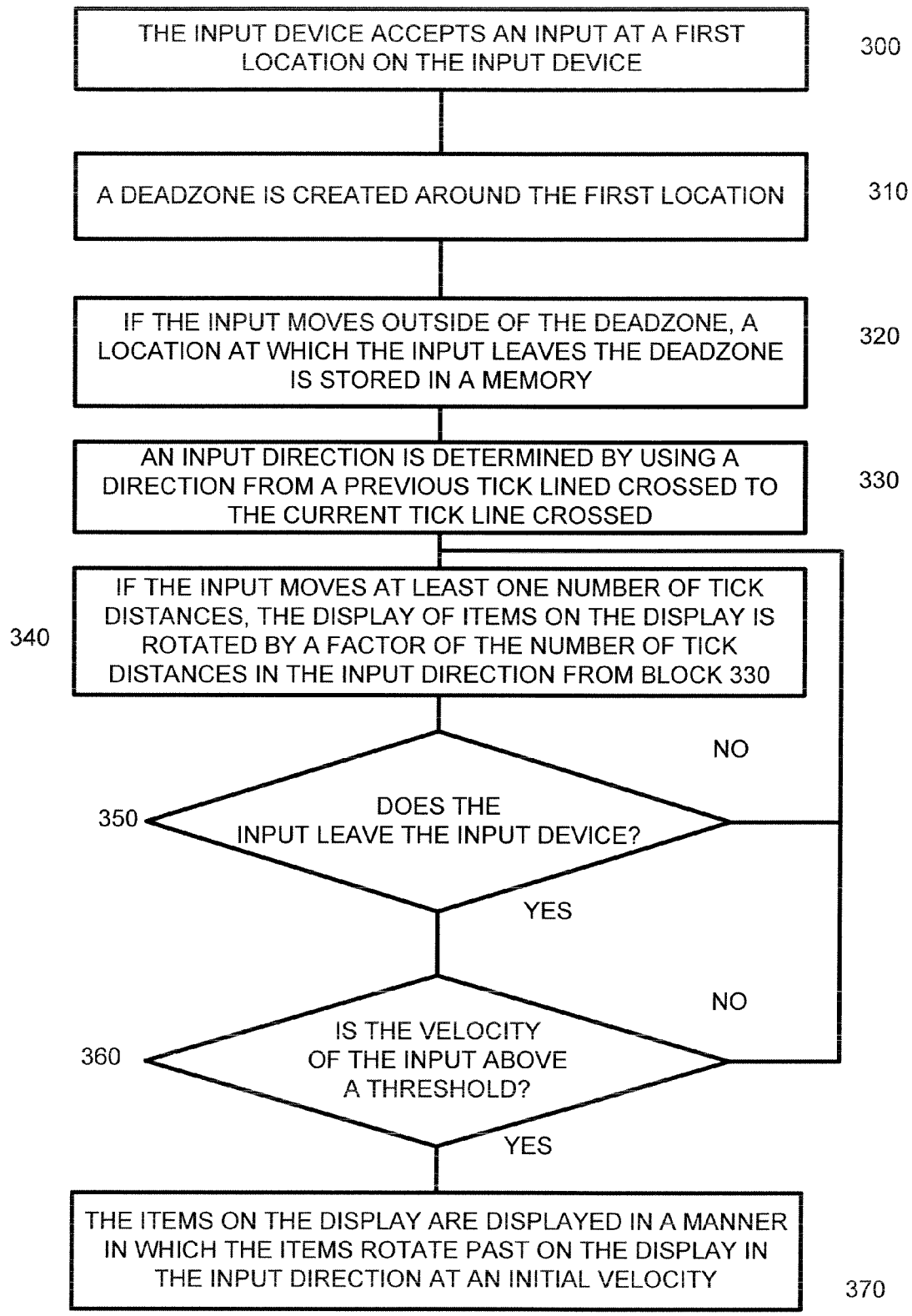
FIG. 3 is a flowchart of a method of navigating a list using input motions.
Figure 4:
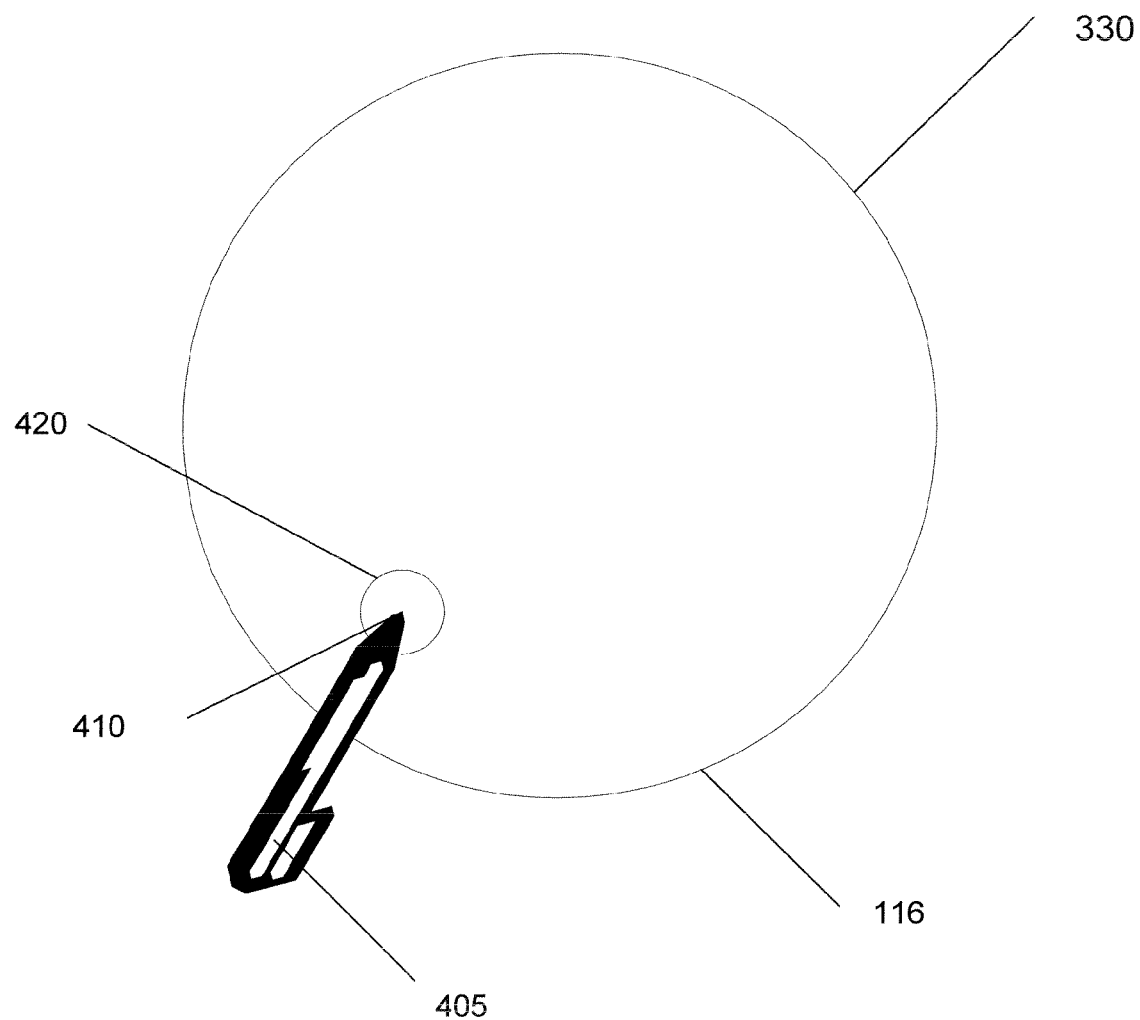
FIG. 4 is an illustration of a input device.

FIG. 3 illustrates a method of navigating items on a display on a computing device 100 with an user input 116 that is touch sensitive. The computing device 100 may be any computing device. In one embodiment, the computing device 100 is a portable computing device such as a portable media player. The touch sensitive input device 116 may be any modern touch input device 116 such as a capacitive surface device. The touch sensitive input device 116 may be mounted in the computing device or may be part of an OLED device and may be the display on the portable computing device. The display may be any appropriate display device 114. The display device 114 may display menus for operating the various options on the computing device. The display device 114 may also display items 115 (FIG. 2a, 2b, 2c) that are stored on the device such as songs, photos, documents, books, videos, emails, phone numbers, email addresses, etc.

At block 300, the input device 116 may accept an input 405 at a first location 410 on the input device 116. The input 405 may be a touch of a finger or from a stylus or any other manner of creating an input 405 on the touch input device 116. At block 310, a deadzone 420 may be created around the current location 410. The deadzone 420 is a zone surrounding the current location 410. In one embodiment, the zone is of a size such that unintentional shifting on the input device 116 is not considered leaving the deadzone 420. The deadzone 420 allows a user to make small input 405 moves without unintentionally activating undesired action. In one embodiment, the size of the deadzone 420 is 50% of the area surrounding the current location 410. Of course, other deadzone 420 sizes are possible. In addition, the size of the deadzone 420 may be adjusted by the user or by applications on the device.

Figure 5:
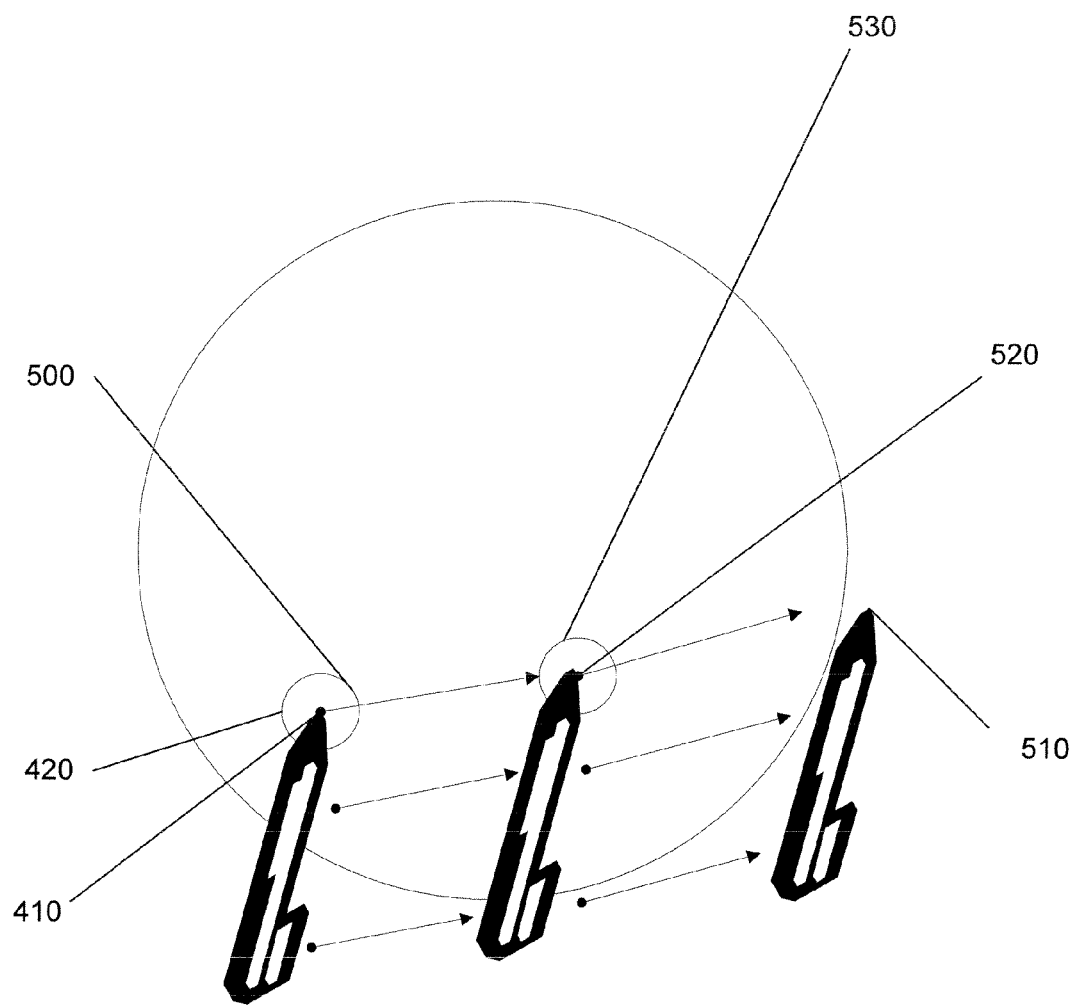
FIG. 5 is an illustration of a moving input to the input device.

At block 320, if the input 405 moves outside of the deadzone 420, a location at which the input 405 leaves the deadzone is stored in a memory 111. FIG. 5 may illustrate an example where a user moves a finger (as an input 405) outside the deadzone 420 and the finger left the deadzone 420 at a location 500. Of course, depending on the sensitivity of the input device 116, multiple surrounding locations may be possible locations 500 at which the input 405 left the deadzone 420. In one embodiment, the locations 500 may be averaged to find a center or in another embodiment, the first input location 500 received outside the deadzone 420 may be used. Of course, other embodiments are possible.

Figure 6:
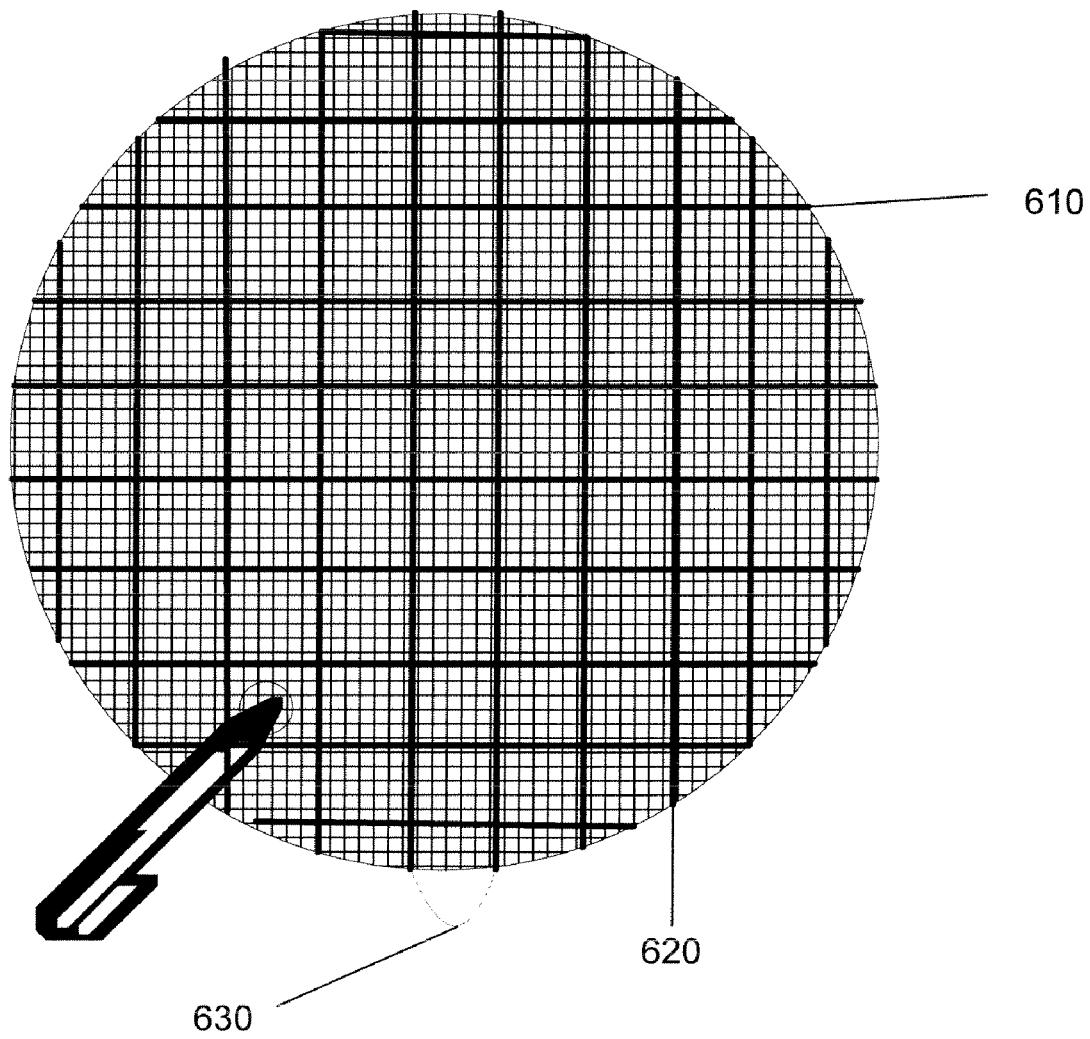
FIG. 6 is an illustration of tick lines on the input device.

At block 330, an input direction may be determined by using a direction from a previous location 410 to a current location 520. For example, the current location 520 may the first location and the previous location 410 may be the location at which the input left the deadzone 500. A vector may be created that connects the current location 520 and the previous location 410. This vector may be used to determine if the user desires to move up through a list of items, down through a list of items, of traverse in virtually any direction through a list of items when a variety of directions are enabled. For example, in a two dimensional list where movement is either up or down through a list, the motion across the input device 116 which primarily moves left to right but also move a bit upward (such as in FIG. 5) would be interpreted as a desire to move up through the list. Referring briefly to FIG. 6, horizontal tick lines 610 and vertical tick lines 620 may be created and the direction may be determined by comparing the location of the previous tick lined crossed to the current tick line crossed.

At block 340, if the input 405 moves at least one number of tick distances, the display of items on the display may be rotated by a factor of the number of tick distances in the input direction from block 330. In some embodiments, the factor is one, but other factors are possible. Referring to FIG. 6, in one embodiment, a grid of tick lines 600, both horizontal 610 and vertical 620, surrounds the first input point 410. The tick distance 630 may be the distance between two horizontal tick lines 610 or two vertical tick lines 620. Of course, the grid could be on different angles and the lines 600 do not have to be perfectly vertical and horizontal. In one embodiment, the lines 600 are rings around the input 405. In addition, the tick distance 630 may be any distance. The distance may be set by programmers for each application operating on the device 100. In addition, the distance may be modifiable by users. In addition, the tick distance may be related to the size of the input 405 at the first location 410. For example, if a user has enormous fingers resulting a large input 405, the tick distance may be larger than if the input 405 size is small. Of course, the distance between the tick lines may be set in the same manner. In another embodiment, the tick distance 630 is a constant for all applications and all users such that users will develop a feel for the size of movements needed to execute a desire action on the computing device 100.

Once an input 405 moves a tick distance 630, the items 115 on the display may be rotated by a factor of the number of tick distances 630 in the input direction from block 330. The moving of a tick distance 630 may be indicated by a notification to the user, such as a click sound or a brief shake of the device using haptic feedback. Of course, other feedback is possible and is contemplated. Referring to FIG. 2A, items 115 are displayed on the display 114 with the song "Black Dog" being the third displayed song. If a user moves two tick distances 630 down, the items may rotate down two items. In FIG. 2B, "Black Dog" now appears as the fifth song, having been moved down two spots. If a user then moves four tick distances 630 up, "Black Dog" may move up four spots to be the first listed song. Of course, one tick distance 630 could move two items 115 or any other variation thereof.

At block 350, if the input 405 leaves the input device 116, a variety of things may occur and control may pass to block 360. If the input 405 stays on the input device 116, the method may return to block 340.

At block 360, a determination is made whether the velocity of the input 405 movement is above a threshold. The velocity may be determined in a variety of ways. As is known, velocity is determined by dividing distance by time. In one embodiment, the velocity is determined by using a location of the input 405 at sampled times and the distance the input traveled during the sampled times is used to determine the velocity. In another embodiment where tick lines are used, a plurality of times that the input crossed a plurality of tick lines is used and the distance the input traveled over the tick lines is used to determine the velocity. In another embodiment, the time the input 405 left the deadzone 420 and the location of leaving the deadzone 500 is stored. Next, the time the input 405 left the perimeter 510 of the input device 116 and the location at which the input 405 left the perimeter 510 of the input device 116 is stored. The two times are subtracted and the distance is determine between the location of leaving the deadzone 500 and location at which the input 405 left the perimeter 510 of the input device 116. From this data, the velocity of the input 405 may be determined. Of course, other manners of calculating velocity are possible. The threshold may be any velocity. Control may pass to block 370

At block 370, the items 115 on the display 114 may be displayed in a manner in which the items rotate past on the display 114 in the input direction at an initial velocity that decreases and in which the initial velocity is in relation to the velocity of the input 405 movement. At a high level, the item 115 may be songs and the songs may rotate sequentially through the display 114 like a bicycle wheel turning with the songs being on the wheel. The speed of a spinning bicycle wheel relates to the velocity of the force applied to the wheel and the wheel eventually slows down. The wheel may slow faster if brakes are applied or may stop altogether if the brakes are applied very hard. In addition, a force applied to a bicycle wheel in the opposite direction in which it is spinning will not immediately bring the wheel up to a high velocity in the opposite direction but will slowly start the wheel spinning in the direction of the force.

Similarly, the items 115 may rotate through the display 114 at a velocity in relation to the velocity of the input 405. A fast input 405, i.e., a fast swipe across the input device 116, may result in a fast rotation of the item 115 list. Similarly, a slow input 405 may result in a slow rotation of the item 115 list. Threshold may be set and input 405 over a threshold may result in the maximum velocity being created.

The velocity also may relate to the number of items 115 in the list. If a number of items 115 is above an item limit, the velocity of rotating the items 115 may be greater and if the number of items 115 is below the item limit, the velocity may be lower. For example, the velocity through a 3,000 song list will be faster than rotating through a 10 song list even though a swipe input 405 of the same velocity may be applied in each case.

In addition, once the list is rotating, subsequent inputs 405 may have a variety of outcomes. Referring to FIG. 5, a subsequent input 520 may be received and a new deadzone 530 may be created around the subsequent input 520. If there is no movement out of the new deadzone 530 and the input 405 stops before a hold period of time, the velocity of the rotation of the items 115 on the display may be decreased. The hold period of time is a time threshold. In one embodiment, the hold period is half a second. The hold period may be user set, set by applications or set at the time of manufacture. In effect, the input 405 is similar to a tap on the input device 116 and the result may be similar to tapping on the brakes of the bike in that the bike may slow some, and in this case, the velocity of rotating the items may be reduce by a braking factor. The braking factor may be factory set, may be set by applications or may be set by users.

If the subsequent input 520 extends beyond the hold period of time, the rotation of the items 115 may be slowed further. In effect, if a user inputs 405 for a time longer than the hold period, the rolling of the items 115 will slow similar to grabbing and holding the brakes on a bicycle.

If there is an input 405 out of the new deadzone 530 before an expiration of the hold period of time and the input 405 is a tick length 630, the display of items 115 may be rotated by a factor in the input direction for each tick length 630 passed. In addition, the rotation of the items 115 may stop after moving the tick length 630.

If the input 405 passes the perimeter 510 of the input device 116 and if the input 405 is in a direction of the current item 115 rotation, the velocity of the rotation may be increased. Similar to applying more force to a spinning wheel in the same direction, the velocity of the wheel and the velocity of the list 115 rotation will increase. If the input 405 is in a direction opposite the current item rotation, the items may be rotated in the direction of the input at a velocity in relation to the velocity of the motion and the velocity at which the items 115 were moving before the input 405. Similar to applying pressure to a spinning wheel in the opposite direction, the wheel may slow, stop or spin in the opposite direction depending on the velocity of the force. The rotation of the items 115 may respond in a similar manner. For example, if the items 115 are is spinning forward at 10 songs per second and a swipe input 305 is applied in the opposite direction at 20 songs per second, the result may be going in the opposite direction at 3 songs per second. Also similar to a bike wheel, when the velocity of the rotating items 115 falls below a threshold, the list of items 115 will stop rotating.

The result of the method is that long lists can be quickly scanned with simple and intuitive movement. By incorporating the concept of a wheel into scrolling through a list of items 115, input movements become intuitive to users. As a result, users can navigate through lists of songs, photos, games, telephone numbers—virtually any list—in an improved manner.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

The invention claimed is:

1. A method of navigating items on a display on a computing device with a touch sensitive input device comprising:

Accepting an input at a first location on the input device;

Creating a deadzone around the first location;

Establishing a grid of tick lines around the input wherein the grid of tick lines comprises vertical tick lines and horizontal tick lines;

If the input moves outside of the deadzone, storing a coordinate location comprising a vertical and horizontal location at which the input leaves the deadzone;

Determining an input direction by using a direction from the coordinate location of a previous tick line crossed to the coordinate location of a current tick line crossed;

If the input moves a number of tick distances wherein the number of tick distances is greater than zero, rotating the display of items by a factor of the tick distances in the input direction;

If the input is removed from the input device,
  Determining a velocity of the input movement using a location of the input at sampled times and the distance the input traveled during the sampled times;
  If the velocity is above a threshold, displaying the items on the display in which the items rotate past on the display in the input direction at an initial velocity that decreases and in which the initial velocity is in relation to the velocity of the input movement.

2. The method of claim 1, wherein if a number of items is above an item limit, the velocity of rotating the items is greater and if the number of items is below the item limit, the velocity is lower.

3. The method of claim 2, further comprising determining the velocity of the input movement using a plurality of times that the input crossed a plurality of tick lines and the distance the input traveled.

4. The method of claim 1, further comprising:
  If the input has been removed from the input device and the velocity is above the threshold,
    Receiving a subsequent input;
    Creating a new deadzone around the subsequent input;
    If there is no movement out of the new deadzone and the input stops before a hold period of time;
      Decreasing the velocity of the rotation of the items on the display.

5. The method of claim 4, further comprising if the subsequent input extends beyond the hold period of time, further decreasing the velocity of the rotation of the items on the display.

6. The method of claim 4, further comprising
  If the subsequent input is out of the new deadzone before an expiration of the hold period of time and
  If the subsequent input is a tick length,
    Rotating the display of items by a factor.

7. The method of claim 6, further comprising
  If the subsequent input is removed from the input device and if the subsequent input is above the threshold, and
  If the subsequent input is in a direction of the current menu rotation,
    Increasing the velocity of the rotation and
  If the subsequent input is in a direction opposite the current item rotation,
    Rotating the items in the direction of the subsequent input at a velocity in relation to the velocity of the subsequent input and the velocity at which the items were moving before the subsequent input.

8. The method of claim 1, wherein if the velocity falls below a threshold, the rotation will stop.

9. A computer storage medium comprising computer executable instructions for navigating items on a display on a computing device with a touch sensitive input device, the computer executable instructions comprising instructions for:
  Accepting an input at a first location on the input device;
  Creating a deadzone around the first location;
  Determining an input direction;
  If the input moves a number of tick distances wherein the number of tick distances is greater than zero, rotating the display of items by the number of tick distances in the input direction;
  If the input is removed from the input device,
    Determining the velocity of the input;
    If the velocity of the input is above a threshold, displaying the items on the display in which the items rotate past on the display in the input direction at an initial velocity that decreases and in which the initial velocity is in relation to the velocity of the input movement.

10. The computer storage medium of claim 9, further comprising computer executable instructions for determining an input direction by using a direction from the coordinate location of a previous tick line crossed to the coordinate location of a current tick line crossed.

11. The computer storage medium of claim 9, further comprising computer executable instructions for determining if the input is removed from the device and if the velocity of the input is above the threshold,
  Receiving a subsequent input;
  Creating a new deadzone around the subsequent input;
  Determining if there is no movement out of the new deadzone and the input stops before a hold period of time and if the determination is true;
    Decreasing the velocity of the rotation of the items on the display.

12. The computer storage medium of claim 11, further comprising computer executable instructions that if the subsequent input extends beyond the hold period of time, further decreasing the velocity of the rotation of the items on the display.

13. The computer storage medium of claim 11, further comprising computer executable instructions that determine if there is an input out of the new deadzone before an expiration of the hold period of time and
  Determine if the input is a tick length, and
    If the determinations are true, computer executable instructions for rotating the display of items by a factor.

14. The computer storage medium of claim 11, further comprising computer executable instructions for that determine
  If the input is removed from the input device and
  if the subsequent input is above the threshold, and
  If the input is in a direction of the current menu rotation,
    increasing the velocity of the rotation; and
  computer executable instructions that determine if the input is in a direction opposite the current item rotation, and if the determination is true,
    rotating the items in the direction of the input at a velocity in relation to the velocity of the input and the velocity at which the items were moving before the input.

15. A portable media device with a processor for executing computer executable instructions, a memory for assisting the processor execute computer executable instructions and an input device wherein the processor is programmed for:
  Accepting an input at a first location on the input device;
  Creating a deadzone around the first location;
  Determining an input direction;
  If the input moves a number of tick distances wherein the number of tick distances is greater than 0, rotating the display of items by a factor of the number of tick distances in the input direction;
  If the input is removed from the input device,
    Determining the velocity of the input movement using a location of the input at sampled times and the distance the input traveled during the sampled times;
    If the velocity is above a threshold, displaying the items on the display in which the items rotate past on the display in the input direction at an initial velocity that decreases and in which the initial velocity is in relation to the velocity of the input movement;
Receiving a subsequent input;
Creating a new deadzone around the subsequent input;
If there is no movement out of the new deadzone and the input stops before a hold period of time;
   Decreasing the velocity of the rotation of the items on the display;
If the subsequent input extends beyond the hold period of time, further decreasing the velocity of rotation of the items;
If there the subsequent input is out of the new deadzone before an expiration of the hold period of time and if the input is a tick length,
   Rotating the display of items by a factor in the direction of the input;
If the subsequent input is in a direction of the current menu rotation and if the input leaves the input pad and if the velocity of the subsequent input is above the threshold,
   Increasing the velocity of the rotation and
If the subsequent input is in a direction opposite the current item rotation and if the input leaves the input pad and if the velocity of the subsequent input is above the threshold,
   Rotating the items in the direction of the input at a velocity in relation to the velocity of the input and the velocity at which the items were moving before the input.

16. The portable media device of claim 15, wherein if a number of items is above an item limit, the velocity of rotating the items is greater and if the number of items is below the item limit, the velocity is lower.

17. The portable media device of claim 15, wherein if the velocity falls below a threshold, the rotation will stop.

18. The portable media device of claim 15, wherein the device is one selected from a group comprising a cell phone, a media player and a game device.

* * * * *